(12) United States Patent
Miyake et al.

(10) Patent No.: US 10,875,790 B2
(45) Date of Patent: Dec. 29, 2020

(54) APPARATUS FOR PRODUCING REFORMING LIQUID AND METHOD FOR PRODUCING REFORMING LIQUID

(71) Applicant: Panasonic Intellectual Property Management Co., Ltd., Osaka (JP)

(72) Inventors: Gaku Miyake, Osaka (JP); Takahiro Kitai, Hyogo (JP); Masanori Minamio, Osaka (JP); Yoshio Yamada, Hyogo (JP); Genichiro Matsuda, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 197 days.

(21) Appl. No.: 15/750,685

(22) PCT Filed: May 17, 2017

(86) PCT No.: PCT/JP2017/018438
§ 371 (c)(1),
(2) Date: Feb. 6, 2018

(87) PCT Pub. No.: WO2017/217170
PCT Pub. Date: Dec. 21, 2017

(65) Prior Publication Data
US 2018/0230027 A1    Aug. 16, 2018

(30) Foreign Application Priority Data

Jun. 15, 2016 (JP) .................................. 2016-118903
Mar. 22, 2017 (JP) .................................. 2017-056161

(51) Int. Cl.
*C02F 1/46* (2006.01)
*C02F 1/30* (2006.01)
(Continued)

(52) U.S. Cl.
CPC .............. *C02F 1/4608* (2013.01); *C02F 1/30* (2013.01); *H05H 1/24* (2013.01); *H05H 1/48* (2013.01);
(Continued)

(58) Field of Classification Search
CPC .. C02F 1/4608; C02F 1/30; C02F 2201/4611; C02F 2201/46175; C02F 2301/026;
(Continued)

(56) References Cited

U.S. PATENT DOCUMENTS 4,772,775 A    9/1988    Leach
5,630,915 A    5/1997    Greene et al.
(Continued)

FOREIGN PATENT DOCUMENTS

CN      105551923      5/2016
JP      1-152635 U     10/1989
(Continued)

OTHER PUBLICATIONS

Extended European Search Report dated Apr. 17, 2019 in corresponding European Patent Application No. 17813073.8.
(Continued)

*Primary Examiner* — Xiuyu Tai
(74) *Attorney, Agent, or Firm* — Wenderoth, Lind & Ponack, L.L.P.

(57) ABSTRACT

An apparatus for producing reforming liquid includes a treatment tank in which an introduced liquid is swirled so as to generate a gas phase in the vicinity of a swirling center of a swirling flow of the liquid, a first electrode which has at least a portion which is disposed in the treatment tank and comes into contact with the liquid in the treatment tank, a second electrode which is disposed so as to come into contact with the liquid in the treatment tank and a power source which is configured to apply a voltage between the
(Continued)

first electrode and the second electrode so as to generate plasma in the gas phase. A reformed liquid is produced in a manner that the plasma is generated in the gas phase so as to form a reformed component, and the formed reformed component is dissolved and dispersed in the liquid.

8 Claims, 19 Drawing Sheets

(51) Int. Cl.
*H05H 1/24* (2006.01)
*H05H 1/48* (2006.01)
*H05H 1/34* (2006.01)

(52) U.S. Cl.
CPC ............. *C02F 2201/4611* (2013.01); *C02F 2201/46175* (2013.01); *C02F 2301/026* (2013.01); *C02F 2303/02* (2013.01); *C02F 2303/04* (2013.01); *C02F 2305/023* (2013.01); *H05H 2001/3468* (2013.01); *H05H 2245/121* (2013.01)

(58) Field of Classification Search
CPC ........... C02F 2303/02; C02F 2303/04; C02F 2305/023; C02F 1/006; C02F 1/34; C02F 1/46104; C02F 1/78; C02F 2301/066; C02F 2209/03; C02F 2201/003; C02F 1/32; H05H 1/24; H05H 1/48; H05H 2001/3468; H05H 2245/121; H01J 37/32; H01J 37/3244; H01J 37/32596; H01J 37/32541; H01J 37/32568; Y10S 422/906
See application file for complete search history.

(56) References Cited

U.S. PATENT DOCUMENTS

| | | | |
|---|---|---|---|
| 6,117,401 A | 9/2000 | Juvan | |
| 6,558,638 B2* | 5/2003 | Zadiraka | B01D 17/0205 |
| | | | 422/186.04 |
| 2007/0240975 A1 | 10/2007 | Foret | |
| 2009/0071910 A1* | 3/2009 | Ike | C02F 1/006 |
| | | | 210/748.19 |
| 2009/0109141 A1 | 4/2009 | Murase et al. | |
| 2009/0201761 A1 | 8/2009 | Matsuno et al. | |
| 2009/0294996 A1 | 12/2009 | Matsumato | |
| 2010/0237048 A1 | 9/2010 | Brothier et al. | |
| 2011/0240567 A1 | 10/2011 | Zolezzi-Garreton | |
| 2012/0111721 A1 | 5/2012 | Foret | |
| 2016/0120013 A1 | 4/2016 | Imai | |
| 2016/0272518 A1 | 9/2016 | Zolezzi-Garreton | |
| 2017/0291830 A1* | 10/2017 | Kang | C02F 1/30 |

FOREIGN PATENT DOCUMENTS

| | | |
|---|---|---|
| JP | 2000-093967 | 4/2000 |
| JP | 2005-230728 | 9/2005 |
| JP | 2006-130410 | 5/2006 |
| JP | 3890076 B | 3/2007 |
| JP | 2007-090175 | 4/2007 |
| JP | 2007-207540 | 8/2007 |
| JP | 2011-501345 | 1/2011 |
| JP | 2012-142150 | 7/2012 |
| JP | 2012-228644 | 11/2012 |
| JP | 2013-519503 | 5/2013 |
| JP | 2013-119043 | 6/2013 |
| JP | 2016-083658 | 5/2016 |
| WO | 2008/038763 | 4/2008 |
| WO | 2011/021515 | 2/2011 |

OTHER PUBLICATIONS

International Search Report of PCT application No. PCT/JP2017/018438 dated Aug. 1, 2017.
English Translation of Chinese Search Report dated May 27, 2020 in corresponding Chinese Patent Application No. 201780002805.1.

* cited by examiner

APPARATUS FOR PRODUCING REFORMING LIQUID AND METHOD FOR PRODUCING REFORMING LIQUID

CROSS-REFERENCE TO RELATED APPLICATIONS

This application is a U.S. national stage application of the PCT International Application No. PCT/JP2017/018438 filed on May 17, 2017, which claims the benefit of foreign priority of Japanese patent applications 2016-118903 filed on Jun. 15, 2016 and 2017-056161 filed on Mar. 22, 2017, the contents all of which are incorporated herein by reference.

TECHNICAL FIELD

The disclosure relates to an apparatus for producing reforming liquid and a method for producing reforming liquid in which a reformed liquid is produced by performing an electrochemical treatment on a liquid. More specifically, the disclosure relates to an apparatus for producing reforming liquid and a method for producing reforming liquid in which a liquid is reformed by generating plasma in the liquid, and thereby a reformed liquid having a sterilizing action and a deodorizing action is produced.

BACKGROUND ART

FIG. 15 illustrates an example of an apparatus for producing reforming liquid in the related art. An apparatus for producing reforming liquid as follows is known. First electrode 801 and second electrode 802 are disposed in liquid 803 (for example, water). A high-voltage pulse from pulse power source 804 is applied between first electrode 801 and second electrode 802, so as to vaporize liquid 803 and generate plasma 805. Thus, a reformed liquid including, for example, a component such as a hydroxyl radical (OH radical) or hydrogen peroxide, which has an oxidizing force is produced. In particular, since the OH radical has a high oxidizing force, for example, a high sterilizing action may be applied to germs by mixing a reformed liquid which contains the above component. It is known that, since plasma 805 is generated in liquid 803, liquid 803 is coated with plasma 805, and thus a component derived from the liquid is easily generated. For example, it is known that plasma 805 is generated in the water, and thus an OH radical or hydrogen peroxide is easily generated.

However, in a case of the above apparatus for producing reforming liquid in the related art, there are problems in that a high applied voltage which is used for vaporizing liquid 803 is required, generation efficiency of plasma 805 is low, and it takes a long time to reform liquid 803.

Meanwhile, an apparatus for producing reforming liquid in which a gas introduced from the outside of the apparatus is caused to be interposed between both the electrodes in order to improve the generation efficiency of the plasma with a low applied voltage is known (see PTL 1). In the apparatus for producing reforming liquid (FIG. 16) disclosed in PTL 1, a pulse voltage is applied between anode electrode 901 and cathode electrode 902 in a state where gas 904 (for example, oxygen) along with treatment target liquid 903 is interposed between anode electrode 901 and cathode electrode 902. The application of the pulse voltage causes plasma to be generated in gas 904, and treatment target liquid 903 is reformed at a contact surface between the plasma and treatment target liquid 903. According to the apparatus for producing reforming liquids disclosed in PTL 1, it is possible to reduce an applied voltage in comparison to that in a case where the gas is not interposed, and it is possible to generate plasma with high efficiency and to reform treatment target liquid 903.

CITATION LIST

Patent Literature

PTL 1: Japanese Patent Unexamined Publication No. 2000-093967

SUMMARY OF THE INVENTION

According to an aspect of the disclosure, an apparatus for producing reforming liquid includes a treatment tank, a first electrode, a second electrode, and a power source. In the treatment tank, a liquid introduced into the treatment tank is swirled so as to generate a gas phase in the vicinity of the swirling center of a swirling flow of the liquid. The first electrode has at least a portion which is disposed in the treatment tank and comes into contact with the liquid in the treatment tank. The second electrode is disposed to come into contact with the liquid in the treatment tank. The power source applies a voltage between the first electrode and the second electrode, so as to generate plasma in the gas phase. A reformed liquid is produced in a manner that the plasma is generated in the gas phase so as to form a reformed component, and the formed reformed component is dissolved and dispersed in the liquid.

According to another aspect of the disclosure, a method for producing reforming liquid includes generating a gas phase in the vicinity of the swirling center of a swirling flow of the liquid in the treatment tank by swirling a liquid introduced into a treatment tank, and producing a reformed liquid in a manner that plasma is generated in the gas phase by applying a voltage to the generated gas phase, so as to form a reformed component, and the formed reformed component is dissolved and dispersed in the liquid.

According to the apparatus for producing reforming liquid and the method for producing reforming liquid according to the aspects of the disclosure, the plasma is generated in a manner that the liquid is vaporized in the swirling flow and a pulse voltage is applied to the generated gas phase. Since it is not necessary that the liquid is vaporized by applying a voltage, it is possible to generate plasma at small power and it is possible to rapidly reform the liquid with high efficiency. Since the liquid is reformed without introducing an air from an outside, it is possible to suppress forming of nitrous acid which is a harmful substance.

DESCRIPTION OF EMBODIMENT

Figure 1:
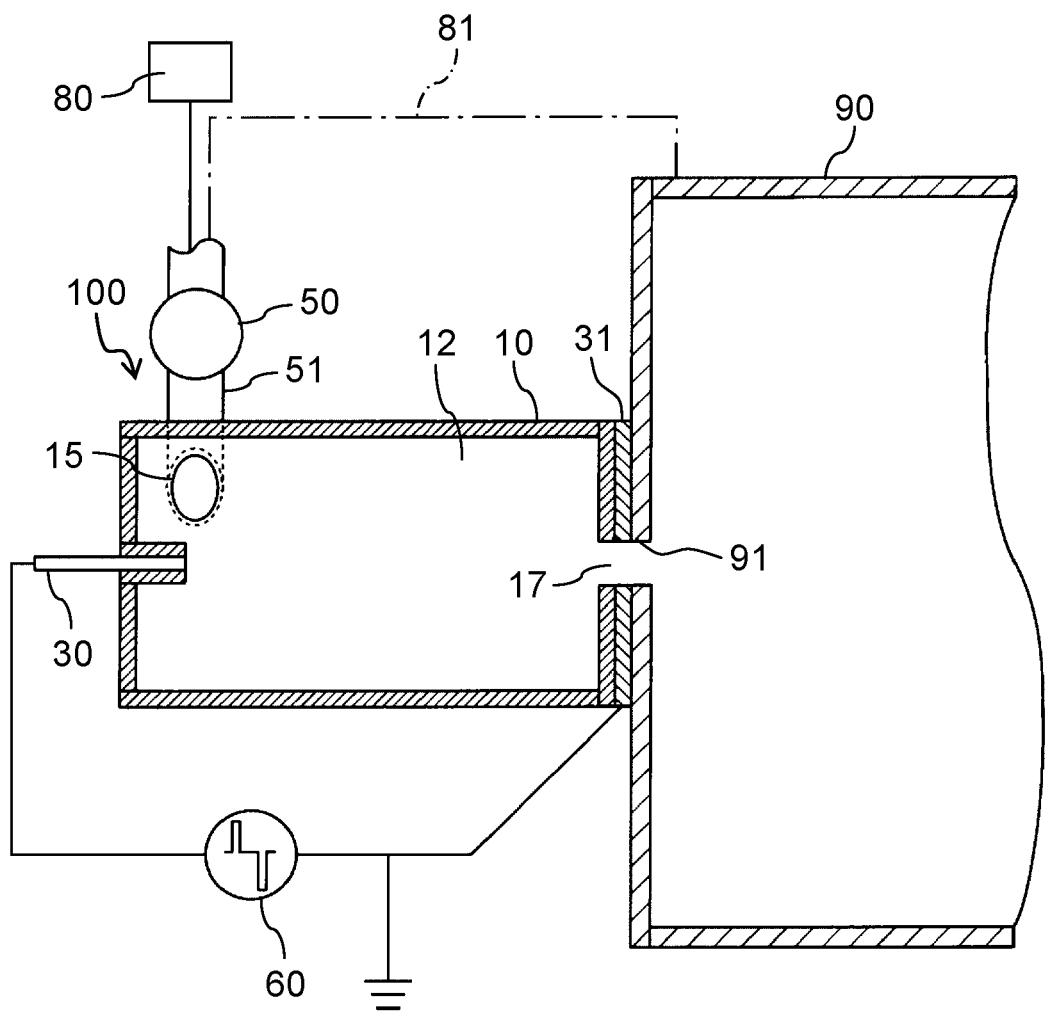
FIG. 1 is a side sectional view illustrating a configuration of an apparatus for producing reforming liquid according to Exemplary embodiment 1.

Before an exemplary embodiment is described, a problem in the related art will be briefly described.

According to the apparatus for producing reforming liquid disclosed in PTL 1, a gas supply device which includes an oxygen tank, a pump, and the like is required for supplying a gas (for example, oxygen) between the anode electrode and the cathode electrode. Therefore, there is a problem in that the size of the apparatus for producing reforming liquid is increased.

Here, it is also considered that an air is supplied between the anode electrode and the cathode electrode in order to reduce the size of the gas supply device. In this case, the oxygen tank is not required, and thus an increase in the size of the apparatus for producing reforming liquid is suppressed. However, in a case where an air is supplied between the anode electrode and the cathode electrode, nitrogen included in the air is changed to nitrous acid ($HNO_2$) which is harmful to human bodies, by plasma, and nitrous acid is contained in a reformed liquid. Therefore, it may be not possible to supply an air as the gas for generating plasma, in accordance with the use purpose of a reformed liquid.

Considering such a point, an object of the disclosure is to provide an apparatus for producing reforming liquid and a method for producing reforming liquid in which it is possible to rapidly reform a liquid by generating plasma with high efficiency and it is possible to suppress forming of nitrous acid which is a harmful substance.

Exemplary Embodiment 1

Hereinafter, apparatus for producing reforming liquid 100 according to Exemplary embodiment 1 will be described in detail with reference to the drawings. The same or corresponding parts in the drawings are denoted by the same reference marks and descriptions thereof will not be repeated. For intelligible descriptions, in the drawings used as the reference in the following descriptions, a configuration is simply or schematically illustrated or some components are omitted. A dimension ratio between the components in the drawings does not necessarily indicate the practical dimension ratio.

[Overall Configuration]

Firstly, an overall configuration of apparatus for producing reforming liquid 100 according to Exemplary embodiment 1 will be described. FIG. 1 is a side sectional view illustrating a configuration of apparatus for producing reforming liquid 100 according to Exemplary embodiment 1. In the following drawings, an arrow indicating forward direction F of apparatus for producing reforming liquid 100 and an arrow indicating backward direction B thereof are marked. An arrow indicating upward direction U and an arrow indicating downward direction D are marked. An arrow indicating rightward direction R when viewed from backward direction B and an arrow indicating leftward direction L when viewed from backward direction B are marked.

Apparatus for producing reforming liquid 100 forms a reformed component by performing electric discharging in a liquid, and produces a reformed liquid by dispersing the reformed component in the liquid. In Exemplary embodiment 1, a case where water L1 (see FIG. 4) as the liquid is reformed, and thus reformed liquid L2 (not illustrated) which includes a reformed component such as an OH radical or hydrogen peroxide is produced will be described.

Apparatus for producing reforming liquid 100 includes at least treatment tank 12, first electrode 30, second electrode 31, and power source 60. Here, in treatment tank 12, an introduced liquid is swirled so as to generate a gas phase in the vicinity of the swirling center of a swirling flow of water L1. First electrode 30 has at least a portion which is disposed in treatment tank 12 and comes into contact with water L1 in treatment tank 12. Second electrode 31 is disposed to come into contact with water L1 in treatment tank 12. Power source 60 applies a voltage between first electrode 30 and second electrode 31 so as to generate plasma in the gas phase. Apparatus for producing reforming liquid 100 produces reformed liquid L2 in a manner that the plasma is generated in the gas phase so as to form a reformed component, and the formed reformed component is dissolved and dispersed in water L1.

More specifically, apparatus for producing reforming liquid 100 includes apparatus main body 10, liquid supplier 50, storage tank 90, and power source 60. Apparatus main body 10 includes treatment tank 12, introduction portion 15, discharging portion 17, first electrode 30, and second electrode 31.

Treatment tank 12 is a component in which a reformed component (for example, OH radical, hydrogen peroxide, or the like) is formed in water L1 introduced into the treatment tank, by plasma. The material of treatment tank 12 may be an insulator or a conductor. In a case of the conductor, it is necessary that an insulator is interposed between first electrode 30 and second electrode 31. When the reformed component is discharged from storage tank 90, the reformed component is dispersed in water L1 and thereby reformed liquid L2 is produced.

Figure 3:
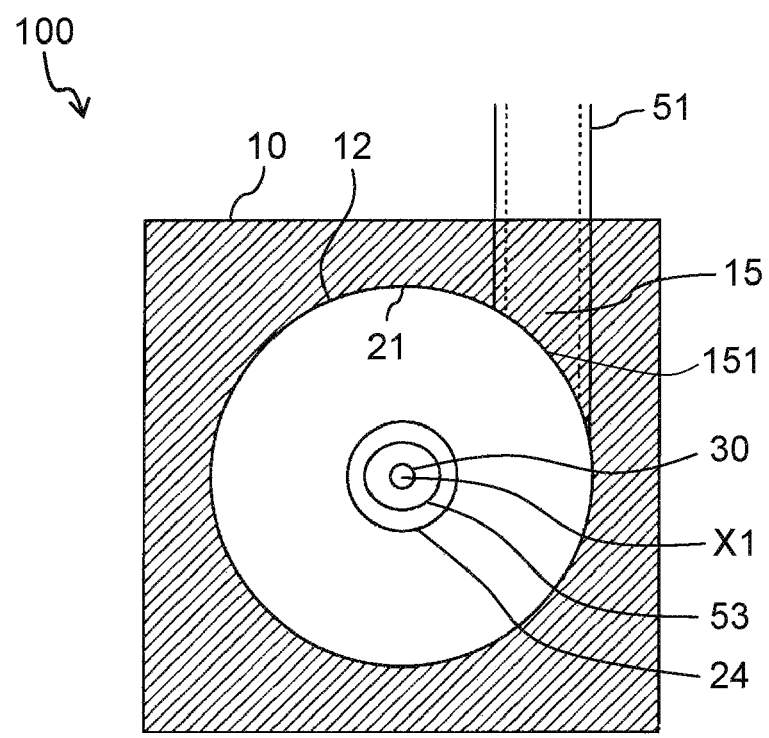
FIG. 3 is a sectional view taken along 3-3 line in FIG. 2.
Figure 3:
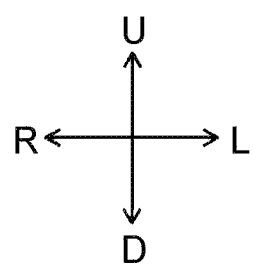

The front sectional shape of an inner wall of treatment tank 12 is circular (see FIG. 3). Introduction portion 15 is disposed at one end of treatment tank 12. Water L1 is introduced into treatment tank 12 from a tangential direction of the circular sectional shape which is orthogonal to central axis X1 of treatment tank 12, through the introduction portion. Introduction portion 15 communicates with liquid supplier 50 via pipe 51. Discharging portion 17 is disposed at the other end of treatment tank 12. Water L1 introduced into treatment tank 12 and the reformed component formed in treatment tank 12 are discharged from treatment tank 12 to storage tank 90 through the discharging portion. In Exemplary embodiment 1, discharging portion 17 is connected to inlet 91 of storage tank 90.

First electrode 30 is disposed in the one end of treatment tank 12. First electrode 30 is disposed to protrude from the center of the inner wall of the one end of treatment tank 12 toward the inside of treatment tank 12 along a longitudinal direction.

Second electrode 31 is disposed on an outside of the wall at the other end of treatment tank 12 and is disposed in the vicinity of discharging portion 17.

First electrode 30 is connected to power source 60 and second electrode 31 is grounded. A pulse voltage which is higher than a voltage of power source 60 is applied to first electrode 30 and second electrode 31. Tungsten is used as an example of the material of first electrode 30.

Liquid supplier 50 is a pump configured to supply water L1 into treatment tank 12, as an example. Liquid supplier 50 is connected to pipe 51. One end of pipe 51 is connected to introduction portion 15 as an inner side opening disposed in the vicinity of the inner wall of the one end of treatment tank 12. The other end of pipe 51 is connected to a liquid supply source (for example, water tank 80) (not illustrated) or storage tank 90, so as to obtain a form in which stored water of storage tank 90, which includes the reformed liquid can be circulated (see circulation pipe 81 indicated by a one-dot chain line in FIG. 1).

Power source 60 applies a high pulse voltage between first electrode 30 and second electrode 31. Power source 60 can alternately apply a positive pulse voltage and a negative pulse voltage, that is, can apply a so-called bipolar pulse voltage.

Storage tank 90 is a tank in which a reformed component discharged from apparatus for producing reforming liquid 100 is sheared, a micro-bubble or a nano-bubble which encloses the reformed component is generated, and the generated bubbles are diffused in water. Specifically, storage tank 90 has a sectional area which is greater than a sectional area of an opening of discharging portion 17 in treatment tank 12. The reformed component which is discharged from discharging portion 17 into storage tank 90 is sheared in storage tank 90. A micro-bubble which encloses the reformed component, or a micro-bubble and a nano-bubble are generated in storage tank 90. The generated bubbles are diffused in the water. Thus, storage tank 90 functions as a micro-bubble generation tank. If storage tank 90 secures an inner diameter or a side which is equal to or longer than twice the dimension of an inner diameter of the opening of discharging portion 17 in treatment tank 12, it is possible to generate a reformed liquid for reliably performing sterilization, in storage tank 90.

[Apparatus Main Body]

Figure 2:
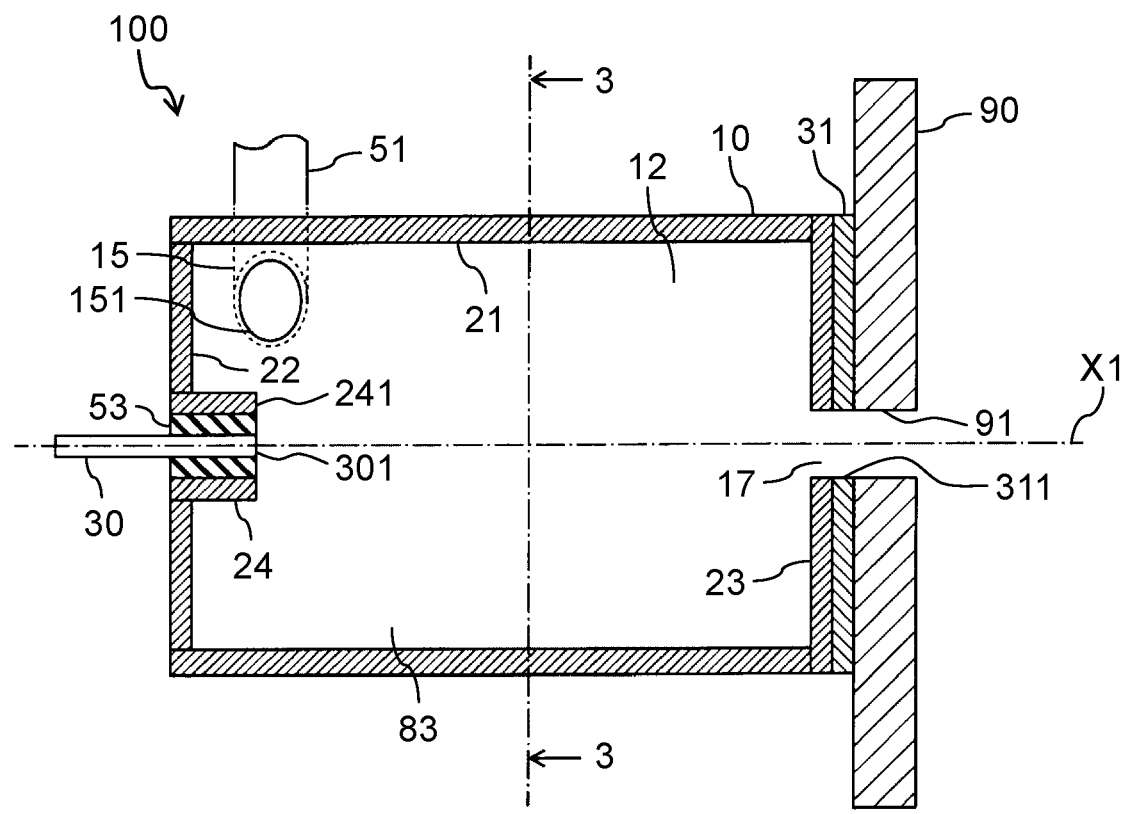
FIG. 2 is a side sectional view illustrating an apparatus main body according to Exemplary embodiment 1.
Figure 2:
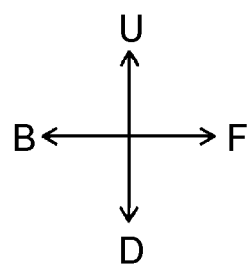

Next, apparatus main body 10 will be described in detail. FIG. 2 is a side sectional view illustrating apparatus main body 10.

Treatment tank 12 includes first inner wall 21, second inner wall 22, and third inner wall 23. First inner wall 21 is a tubular wall portion. Second inner wall 22 is provided at the left end portion of first inner wall 21 in FIG. 2. Third inner wall 23 is provided at the right end portion of first inner wall 21 in FIG. 2. Second inner wall 22 and third inner wall 23 are substantially circular when viewed from a side. First inner wall 21, second inner wall 22, and third inner wall 23 constitute accommodation space 83 which has a substantially columnar shape, in treatment tank 12. Central axis of first inner wall 21, that is, a virtual central axis of accommodation space 83 which has a substantially columnar shape and is configured in treatment tank 12 is assumed to be X1.

In the following descriptions, "one end portion side of central axis X1" or "one end portion side of first inner wall 21" is assumed to be the left side in FIG. 2, on which second inner wall 22 is disposed. In addition, "the other end portion side of central axis X1" or "the other end portion side of first inner wall 21" is assumed to be the right side in FIG. 2, on which third inner wall 23 is disposed.

Cylindrical electrode support tube 24 which protrudes into accommodation space 83 is provided at the center of second inner wall 22. Electrode support tube 24 is tubular and is extended toward the right. Electrode support tube 24 is disposed so as to cause the central axis of the electrode support tube to coincide with central axis X1 of first inner wall 21. First electrode 30 is supported on an inner side of electrode support tube 24, with insulator 53 interposed between the electrode support tube and the first electrode. First electrode 30 has a rod shape. Insulator 53 is disposed around first electrode 30. Therefore, first electrode 30 is disposed so as to cause an axis of the first electrode in the longitudinal direction to coincide with central axis X1 of first inner wall 21. An inner side end surface of right end portion 301 of first electrode 30, an inner side end surface of insulator 53, and inner side end surface 241 of electrode support tube 24 are configured so as to be disposed in the substantially same plane.

Introduction portion 15 penetrates apparatus main body 10. One opening end 151 of introduction portion is formed in first inner wall 21. Introduction portion 15 is disposed at a position which is adjacent to second inner wall 22, when viewed from a side. FIG. 3 is a sectional view taken along 3-3 line in FIG. 2. Introduction portion 15 is disposed on a wall surface of first inner wall 21.

Discharging portion 17 penetrates the central portion of third inner wall 23. Discharging portion 17 is formed so as to cause the central axis of the discharging portion to coincide with central axis X1 of first inner wall 21.

Second electrode 31 is a metal member having a plate shape. Opening portion 311 is formed at the central portion of the second electrode. Opening portion 311 is formed so as to have a circular shape and to cause the center of opening portion 311 to coincide with central axis X1 of first inner wall 21.

Here, second electrode 31 is an electrode which has a plate shape and is disposed so as to surround at least a portion of the entire circumference of central axis X1 on the other end portion side (right side in FIG. 2) of first inner wall 21.

[Operation]

Figure 4:
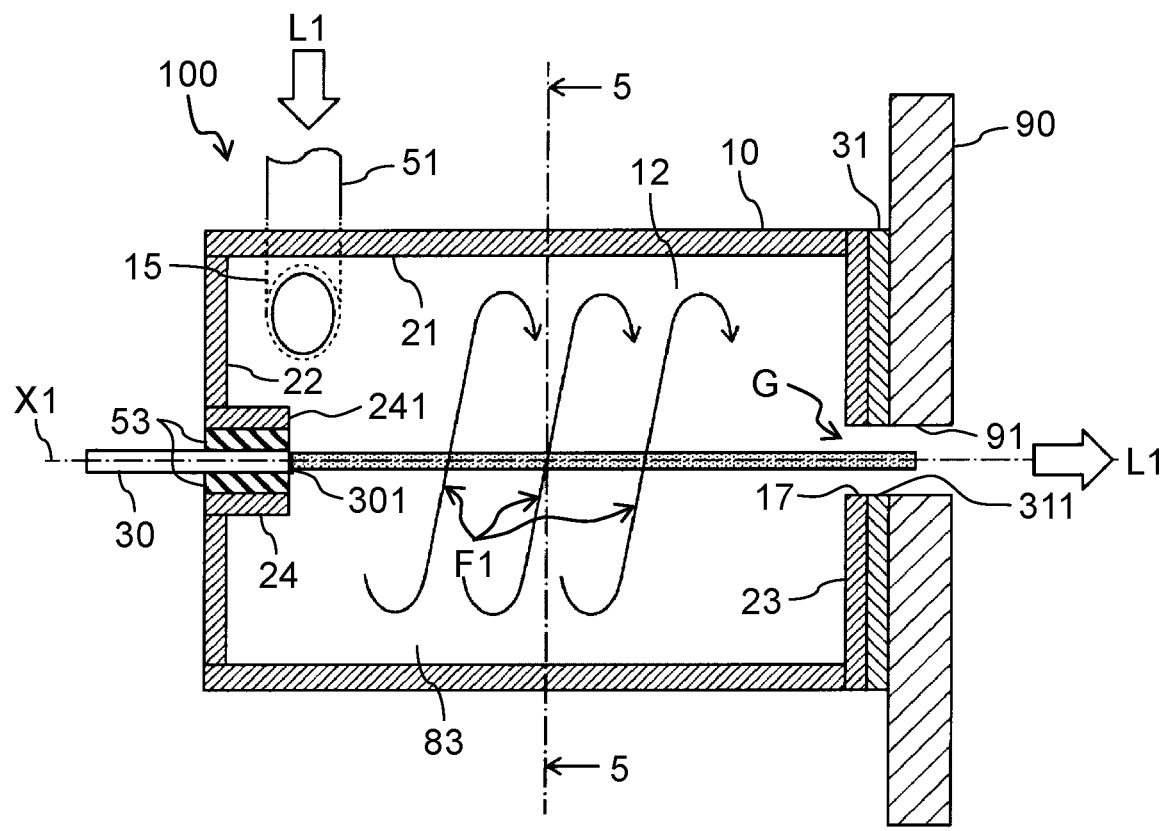
FIG. 4 is a side sectional view illustrating a state where a swirling flow is generated in a treatment tank and a voltage is not applied, according to Exemplary embodiment 1.
Figure 4:
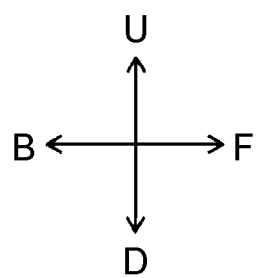

Next, an operation of apparatus for producing reforming liquid 100 will be described. In the following descriptions, for convenient descriptions, a state (FIGS. 4 and 5) where a gas phase is generated in treatment tank 12, and a state (FIGS. 6A and 6B) where a pulse voltage is applied to generated gas phase G, so as to generate plasma P will be separately described with reference to the drawings which are different from each other. FIG. 4 is a side sectional view illustrating a state where swirling flow F1 is generated in treatment tank 12 and a pulse voltage is not applied.

Firstly, as illustrated in FIG. 4, if water L1 is introduced from introduction portion 15 to treatment tank 12 at predetermined pressure, water L1 moves from introduction portion 15 along first inner wall 21 in right direction in FIG. 4, while swirling flow F1 is generated. Swirling flow F1 which has moved in the right direction in FIG. 4 while swirling moves toward discharging portion 17.

That is, treatment tank 12 includes introduction portion 15 configured to introduce water L1 into treatment tank 12 and discharging portion 17 configured to discharge water L1 from treatment tank 12. Thus, in treatment tank 12, water L1 introduced from introduction portion 15 is swirled from introduction portion 15 toward discharging portion 17, and thereby swirling flow F1 is generated.

Here, as illustrated in FIG. 4, first electrode 30 is disposed on central axis X1 or on one end portion side (left side in FIG. 4) in the vicinity of central axis X1. Second electrode 31 is disposed on central axis X1 or one the other end portion side (right side in FIG. 4) in the vicinity of central axis X1. Introduction portion 15 is disposed on the one end portion side (left side in FIG. 4) of central axis X1. Discharging portion 17 is disposed on the other end portion side (right side in FIG. 4) of central axis X1.

Swirling flow F1 causes pressure in the vicinity of central axis X1 of first inner wall 21 to be decreased to be equal to or lower than the saturated water vapor pressure. In addition, water vapor is generated by vaporizing a portion of water L1. Thus, gas phase G is formed in the vicinity of central axis X1 of first inner wall 21. Gas phase G is generated in the vicinity of the swirling center. Specifically, gas phase G is generated from right end portion 301 of first electrode 30 to the vicinity of opening portion 311 of second electrode 31 along central axis X1 of first inner wall 21. Gas phase G is swirled by swirling flow F1, in the same direction as that of swirling flow F1. Gas phase G which swirls is sheared to form a micro-bubble or a nano-bubble, in a state where resistance of the water in storage tank 90 is applied to the vicinity of discharging portion 17. The formed bubbles are diffused in storage tank 90. Here, first electrode 30 is disposed to come into contact with gas phase G which is generated in the vicinity of the swirling center of swirling flow F1 of water L1, or is disposed to be positioned in the vicinity of gas phase G.

Figure 5:
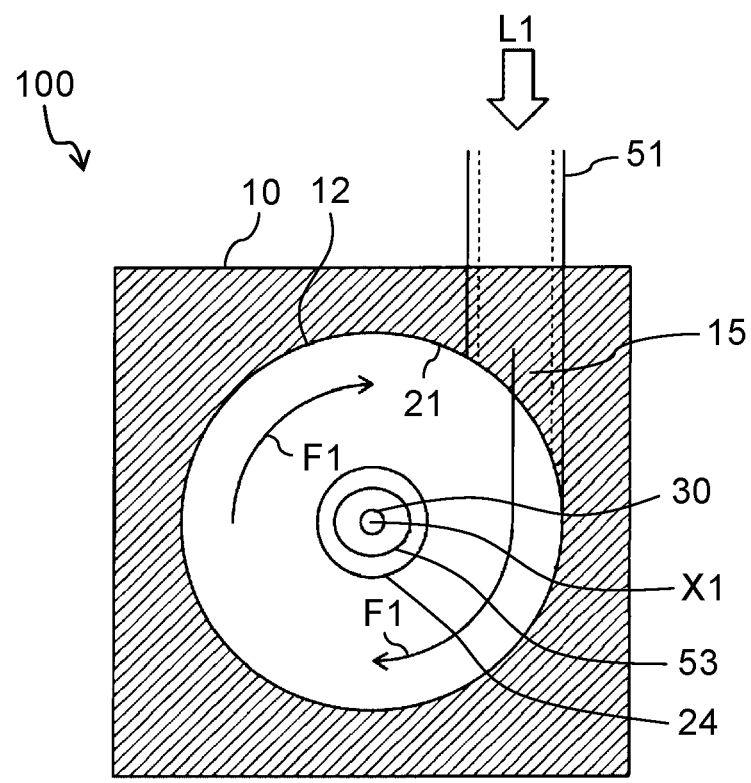
FIG. 5 is a sectional view taken along 5-5 line in FIG. 4.
Figure 5:
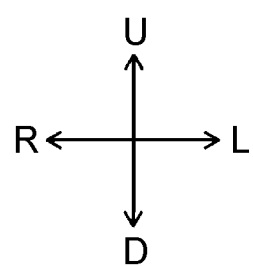

FIG. 5 is a sectional view taken along 5-5 line in FIG. 4. As illustrated in FIG. 4, if water L1 is introduced from introduction portion 15 to treatment tank 12 at predetermined pressure, clockwise swirling flow F1 in FIG. 5 is generated along first inner wall 21 by using water L1. Since water L1 is swirled in treatment tank 12, pressure in the vicinity of the center of swirling flow F1, that is, in the vicinity of central axis X1 of first inner wall 21 is decreased to be equal to or lower than the saturated water vapor pressure. In addition, water vapor is generated in the vicinity of central axis X1 of first inner wall 21 by vaporizing a portion of water L1. Thus, gas phase G is formed.

Figure 6A:
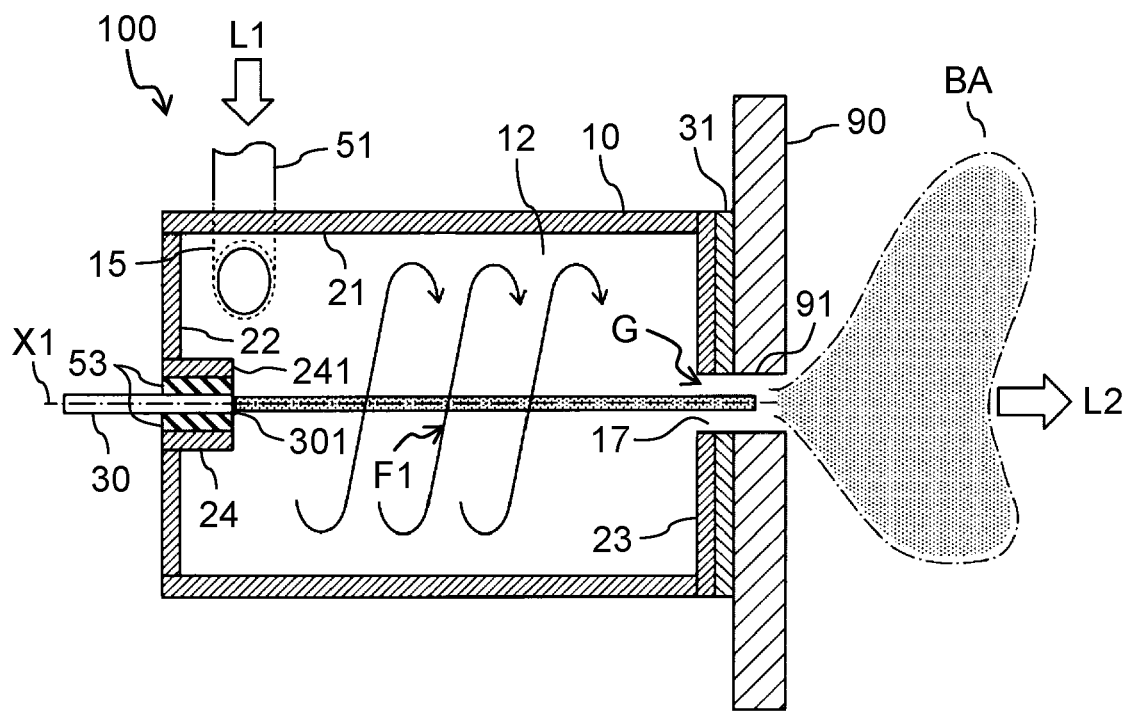
FIG. 6A is a side sectional view illustrating a state where the swirling flow is generated in the treatment tank and the voltage is applied, according to Exemplary embodiment 1.
Figure 6A:
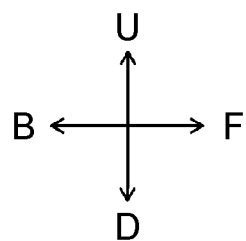
Figure 6B:
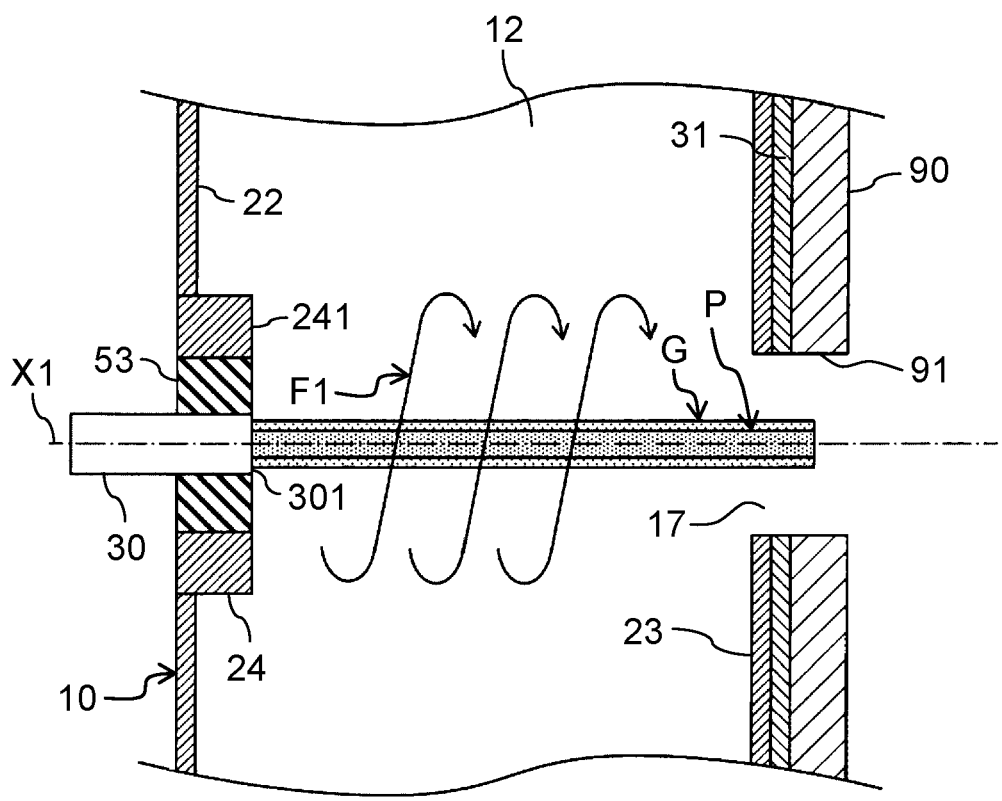
FIG. 6B is a partial enlarged view illustrating a state where plasma is generated in the gas phase in FIG. 6A.
Figure 6B:
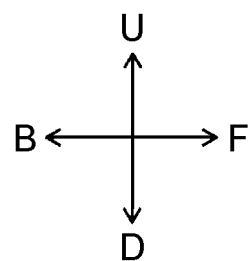

FIGS. 6A and 6B are side sectional views illustrating a state where swirling flow F1 is generated in treatment tank 12 and a pulse voltage is applied. As illustrated in FIG. 6A, a high pulse voltage is applied between first electrode 30 and second electrode 31 by power source 60, in a state where gas phase G obtained by vaporizing water L1 is generated from the vicinity of first electrode 30 to the vicinity of second electrode 31. FIG. 6B is an enlarged view illustrating a state where plasma P is generated in gas phase G. If the high pulse voltage is applied between first electrode 30 and second electrode 31, first electrode 30 and second electrode 31 cause plasma P to be generated in gas phase G, and causes a radical (OH radical or the like), a compound (hydrogen peroxide or the like), or an ion derived from the water to be generated as the reformed component. Gas phase G including the reformed component is swirled by swirling flow F1 around gas phase G, in the same direction as that of swirling flow F1. Since gas phase G including the reformed component is swirled, a portion of the reformed component is dissolved on swirling flow F1 side, and thus the reformed component is dispersed in water L1. In addition, gas phase G which includes the reformed component in the vicinity of discharging portion 17 is sheared in a state of receiving resistance of water L1 in storage tank 90, and thus bubbles BA which contain the reformed component are generated. The reformed liquid is held in storage tank 90, and thus an occurrence of a situation in which an air is mixed in gas phase G in a state of negative pressure is prevented. In this manner, reformed liquid L2 dispersed in water L1 is held in storage tank 90, in a state where the reformed component generated by plasma P is in a bubble state or in a state of being dissolved in water L1.

[Advantageous Effects and Like]

According to Exemplary embodiment 1 described above, apparatus for producing reforming liquid 100 includes treatment tank 12, first electrode 30, second electrode 31, and power source 60. In treatment tank 12, an introduced liquid is swirled, and thus a gas phase is generated in the vicinity of the swirling center of a swirling flow of water L1. First electrode 30 has at least a portion which is disposed in treatment tank 12 and comes into contact with water L1 in treatment tank 12. Second electrode 31 is disposed to come into contact with water L1 in treatment tank 12. Power source 60 applies a voltage between first electrode 30 and second electrode 31 so as to generate plasma in gas phase G. Apparatus for producing reforming liquid 100 produces reformed liquid L2 in a manner that plasma P is generated in gas phase G so as to form a reformed component, and the formed reformed component is dissolved and dispersed in water L1.

According to Exemplary embodiment 1 described above, a method for producing reforming liquid includes a process of swirling water L1 introduced into treatment tank 12 so as to generate gas phase G in the vicinity of the swirling center of swirling flow F1 of water L1, in treatment tank 12, and a process of producing reformed liquid L2 in a manner that plasma P is generated in gas phase G by applying a voltage to generated gas phase G, so as to form a reformed component, and the formed reformed component is dissolved and dispersed in water L1.

Here, plasma P is generated in a manner that water L1 is vaporized in swirling flow F1 and a pulse voltage is applied to generated gas phase G. Therefore, gas phase G has negative pressure in comparison to a gas phase formed by a gas which is vaporized by Joule heat, or a gas introduced from the outside thereof, and plasma P can be generated at a smaller voltage. Accordingly, it is possible to reform water L1 with high efficiency. Further, since the water is not vaporized by Joule heat, the amount of applied energy is reduced. Since a gas is not introduced from the outside thereof, a gas supply device is unnecessary and it is easy to reduce the size of the apparatus for producing reforming liquid.

A gas phase G formed by a gas which is vaporized by Joule heat or formed by a gas introduced from the outside thereof has difficulty in holding a predetermined shape or being held at a predetermined position by buoyancy. However, in a case of gas phase G in Exemplary embodiment 1, a force is applied in a direction in which swirling flow F1 is gathered on central axis X1 by swirling flow F1 around gas phase G. Thus, it is possible to uniformly form gas phase G in the vicinity of right end portion 301 of first electrode 30. Therefore, a change of the amount of a gas formed between first electrode 30 and second electrode 31 over time is small and it is difficult to change power required for plasma P. Thus, it is possible to stably generate plasma P and to reform water L1 with high efficiency.

The volume of plasma P is equal to or smaller than the volume of the gas phase which is in the vicinity of the cathode electrode. However, the shape of gas phase G formed by a gas which is vaporized by Joule heat, or a gas introduced from the outside thereof has a bubble shape. Thus, if the volume thereof is equal to or greater than a predetermined value, the shape thereof is broken. Consequently, it is difficult to generate plasma P having a predetermined volume or greater. However, regarding gas phase G in Exemplary embodiment 1, it is easy to increase the volume thereof in a direction of central axis X1 so long as the swirling speed of swirling flow F1 can be secured. Thus, it is easy to increase the volume of plasma P. Therefore, it is possible to easily increase the amount of the generated reformed component and to rapidly reform water.

Cavitation in which, since the volume of a liquid is expanded when the liquid is vaporized, a shock wave is generated and thus the surrounding object is broken is known. In Exemplary embodiment 1, a portion which is most intensively broken by the cavitation is discharging portion 17 which has the smallest inner diameter in treatment tank 12 and at which the swirling speed of swirling flow F1 is fastest. Therefore, gas phase G at right end portion 301 of first electrode 30 among gas phases G has a small influence on first electrode 30 by the cavitation because right end portion 301 is separated from a place in which breaking by the cavitation occurs most intensively. Thus, it is possible to stably generate plasma P.

Since treatment of water L1 is performed without introducing an air from the outside thereof, it is possible to suppress an occurrence of a situation in which harmful nitrous acid is generated by plasma P which is generated by using a gas phase obtained by introducing a gas such as an air, which includes a nitrogen component. Further, it is possible to produce reformed liquid L2 including bubbles BA which enclose OH radicals, hydrogen peroxide, or the like.

MODIFICATION EXAMPLE

The configuration of apparatus for producing reforming liquid 100 described in Exemplary embodiment 1 is just an example, and can be variously modified. For example, an internal structure of treatment tank 12, a position of first electrode 30 or second electrode 31, or the like is not limited to the structure in Exemplary embodiment 1.

Figure 7:
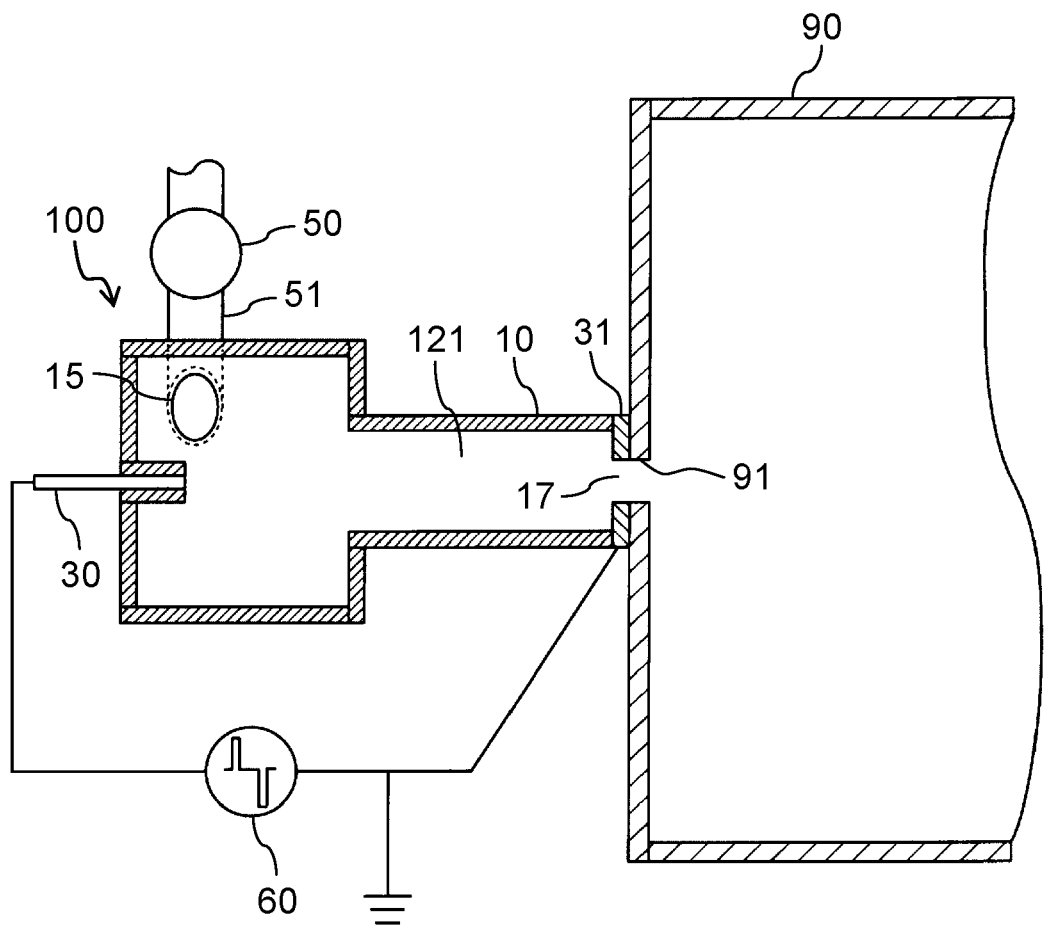
FIG. 7 is a side sectional view illustrating a modification example of the apparatus main body.

In Exemplary embodiment 1, treatment tank 12 has a simple cylindrical shape. However, treatment tank 12 may have various shapes so long as treatment tank 12 is a tubular treatment tank having a circular sectional shape, and a discharging portion which has a hole shape and is retracted on the central axis of the treatment tank or in the vicinity of the central axis is provided at one end portion of the treatment tank. For example, as illustrated in FIG. 7, even though treatment tank 121 is obtained by combining cylinders which have different radii, the similar effect is obtained. In FIG. 7, a configuration in which the radius on the introduction portion side is greater than the radius on the discharging portion side is made. Alternatively, even in a case of treatment tank 122 which has a truncated cone shape and is illustrated in FIG. 8, the similar effect is obtained.

Figure 8:
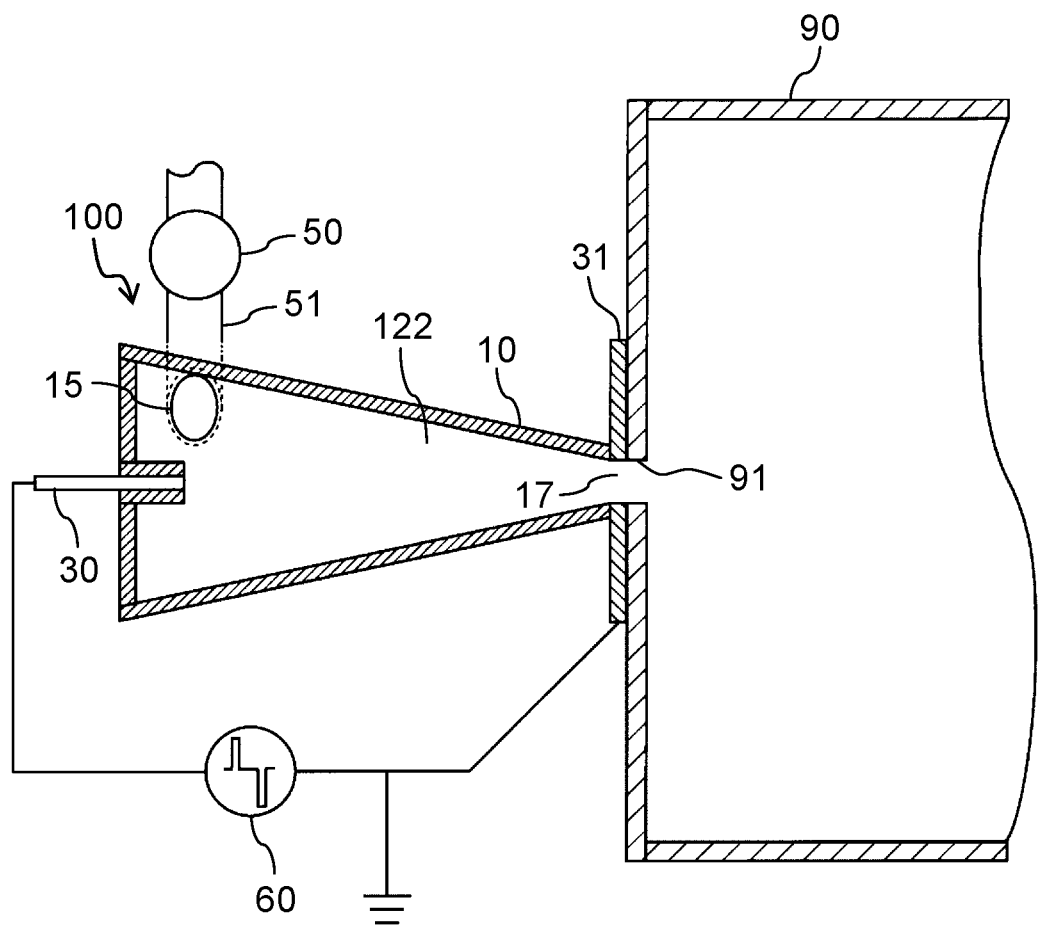
FIG. 8 is a side sectional view illustrating a modification example of the apparatus main body.
Figure 8:
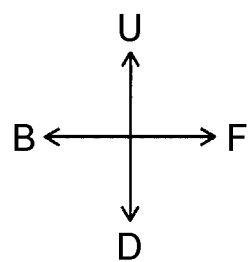

Preferably, in order to prevent sliding of swirling flow F1 in forward direction F, as illustrated in FIG. 8, the truncated cone shape in which an inner diameter of the section is continuously reduced is preferable. That is, it is preferable that the treatment tank according to the disclosure has the first inner wall which has a cylindrical shape or a truncated cone shape for swirling water supplied from the introduction portion so as to generate a swirling flow. Here, the first electrode is disposed on the central axis of the first inner wall or in the vicinity of the central axis.

Figure 9A:
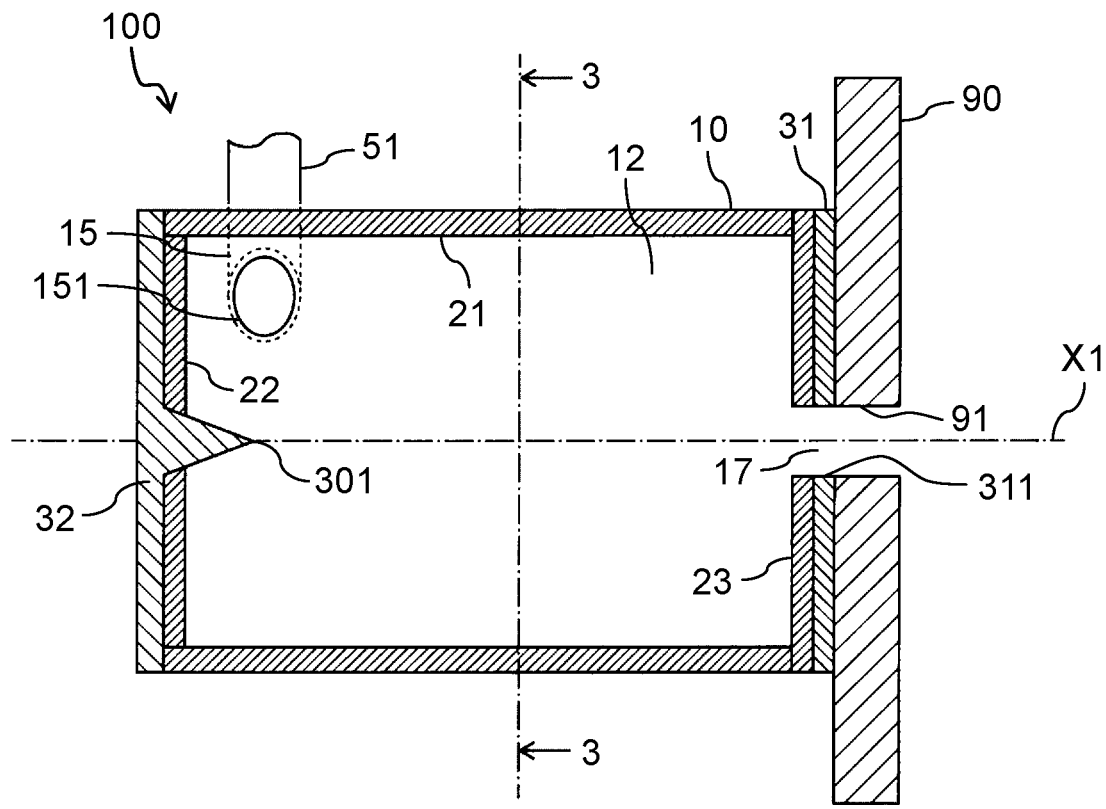
FIG. 9A is a side sectional view illustrating a modification example of the apparatus main body.
Figure 9A:
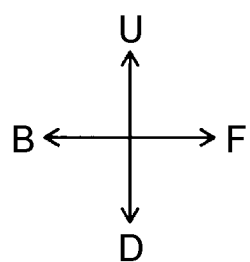
Figure 9B:
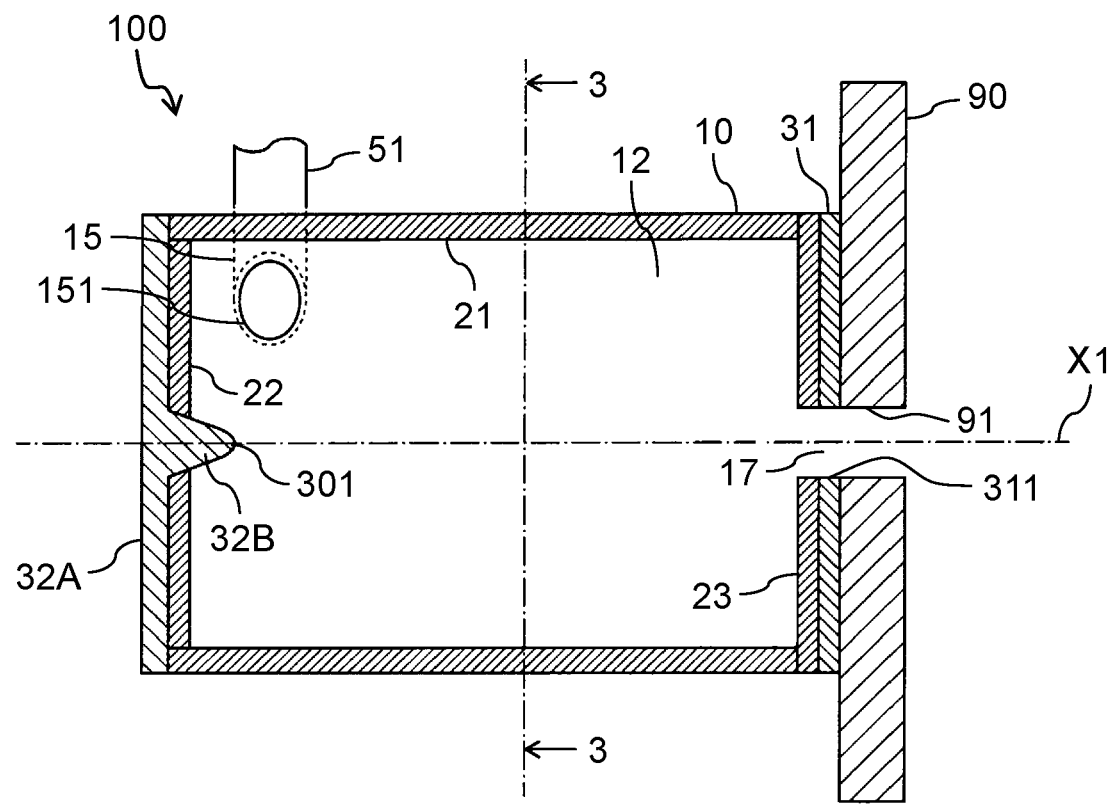
FIG. 9B is a side sectional view illustrating a modification example of the apparatus main body, which is different from that in FIG. 9A.
Figure 9B:
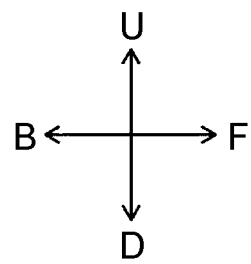

In Exemplary embodiment 1, the shape of first electrode 30 is a rod electrode, but is not limited thereto so long as the shape thereof causes electrolytic to be concentrated on right end portion 301 of first electrode 30. For example, as illustrated in FIG. 9A, first electrode 32 which has a plate shape and to which a conical shape protruding toward the discharging portion side is attached may be provided. As illustrated in FIG. 9B, instead of the conical shape, first electrode 32A which has a plate shape and has protrusion portion 32B at the central portion may be provided. Protrusion portion 32B has a mountain shape and protrudes so as to be bent toward the discharging portion side. In first electrode 32A which has a plate shape and has protrusion portion 32B having a mountain shape at the central portion, the central portion of the protrusion portion, which is closest to generated plasma P is easily worn. Thus, an electrode having protrusion portion 32B which is obtained by causing the central portion to protrude into treatment tank 12, and has a mountain shape is preferable in comparison to a simple flat electrode, because of a longer lifespan. Further preferably, instead of first electrode 32 having a plate shape, a rod electrode which is easily sent into treatment tank 12 when the electrode is worn may be provided.

Figure 10:
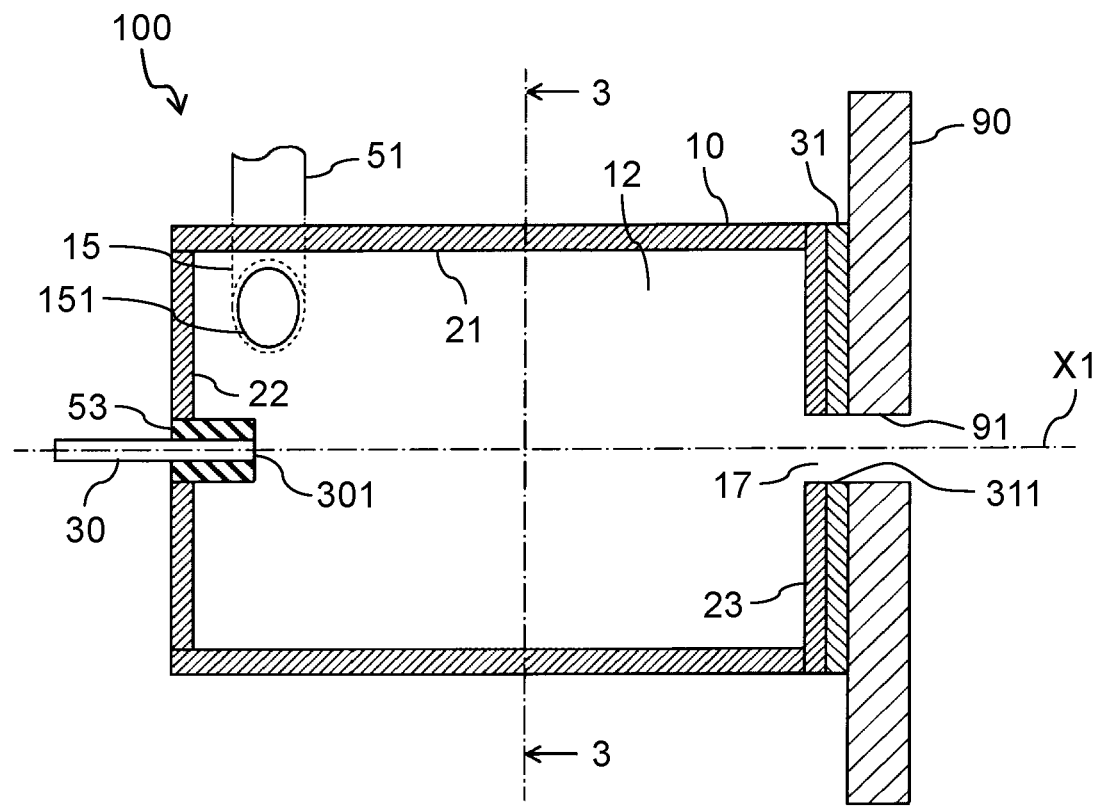
FIG. 10 is a side sectional view illustrating a modification example of the apparatus main body.
Figure 10:
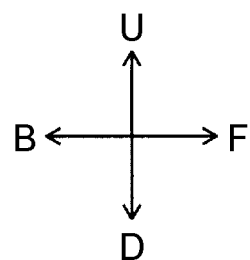

As illustrated in FIG. 10, even though a configuration in which first electrode 30 and insulator 53 are attached to second inner wall 22 without using electrode support tube 24 of first electrode 30 is made, the similar effect is obtained. Preferably, in order to suppress an occurrence of electrolysis of water or generation of the Joule heat, portions other than a connection portion between right end portion 301 of first electrode 30 and power source 60, which is required for generating plasma may be covered with an insulator.

In Exemplary embodiment 1, an example of the material of first electrode 30 is tungsten, but the material thereof is not particularly limited so long as the material is a conductive material. Preferably, a metal material which can exhibit a high sterilization effect by causing the Fenton reaction if the material comes into contact with hydrogen peroxide in water is preferable. For example, SUS (stainless steel), copper, or copper tungsten may be used.

Figure 11:
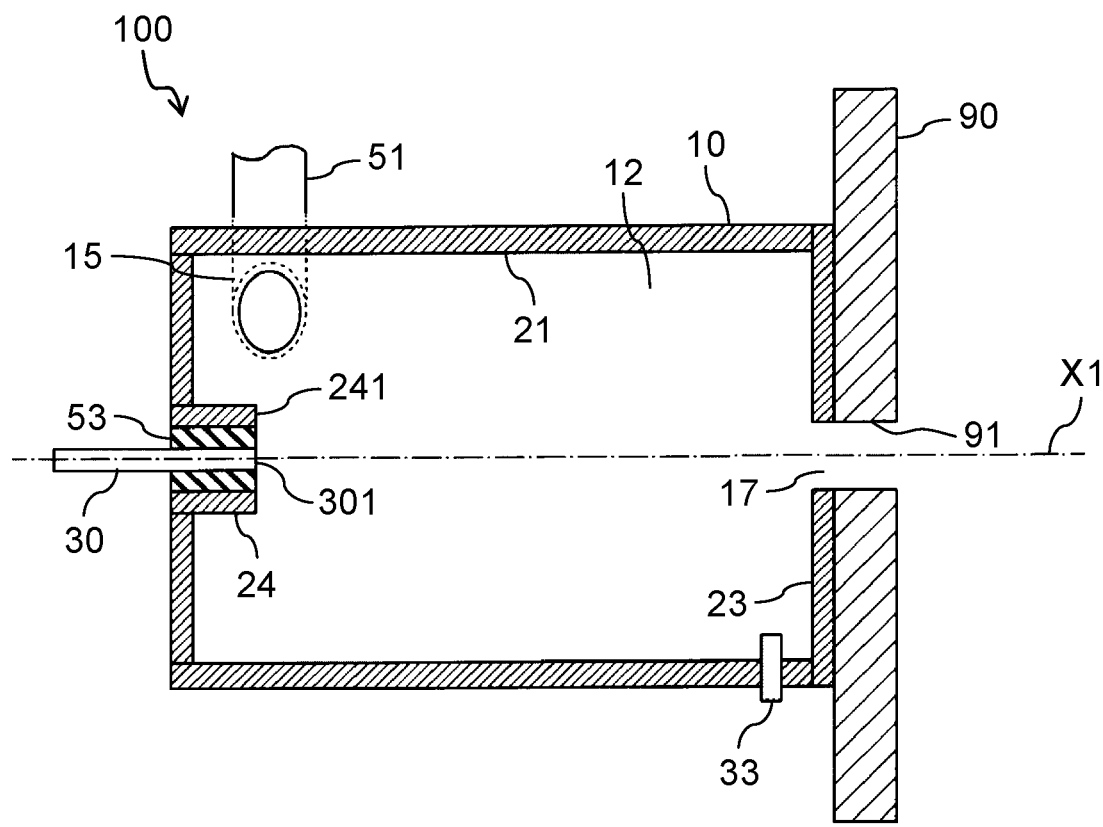
FIG. 11 is a side sectional view illustrating a modification example of the apparatus main body.
Figure 11:
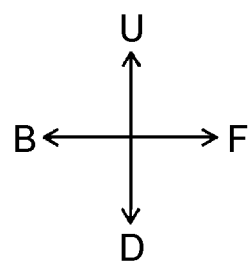
Figure 12:
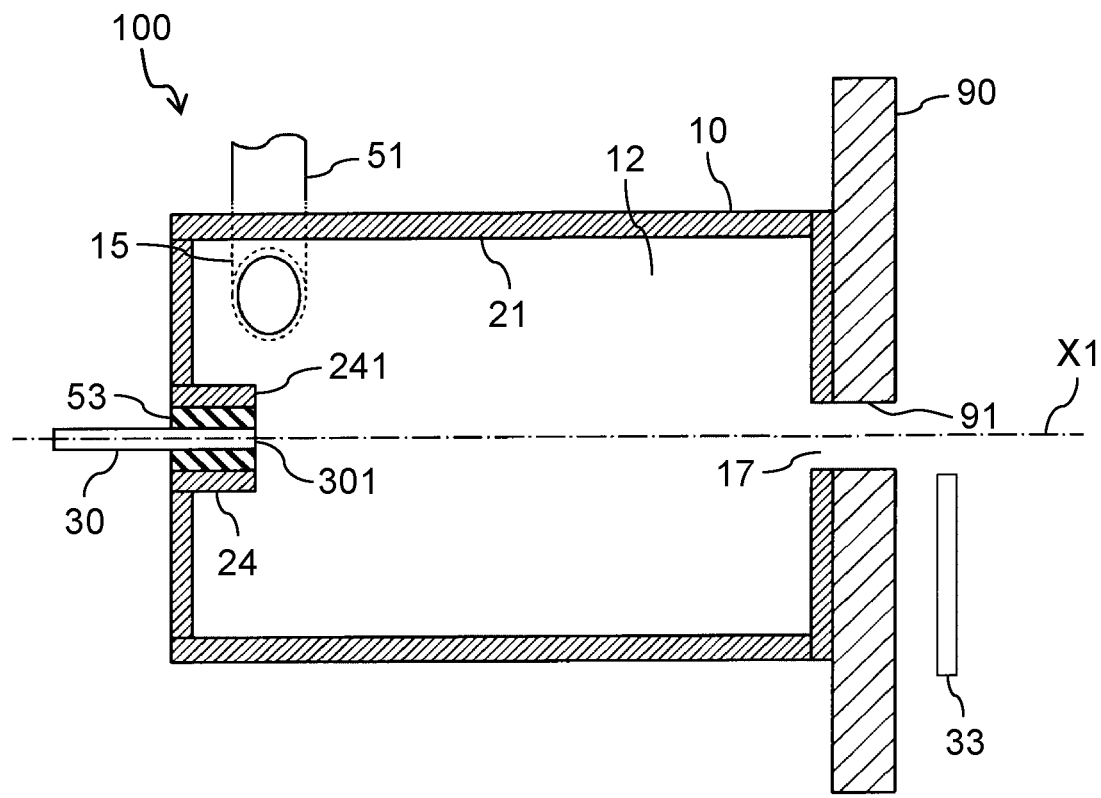
FIG. 12 is a side sectional view illustrating a modification example of the apparatus main body.
Figure 12:
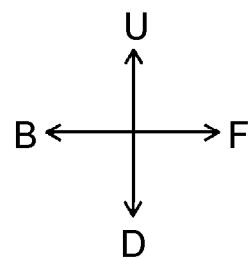

In Exemplary embodiment 1, second electrode 31 is disposed at discharging portion 17, but the position of the second electrode is not limited so long as at least a portion of the grounded second electrode is disposed in treatment tank 12. For example, regarding a disposition place, as illustrated in FIG. 11, even though second electrode 33 having a rod shape is set to be disposed on a side of central axis X1 of first inner wall 21 (for example, as illustrated in FIG. 11, the second electrode is disposed at a position of penetrating first inner wall 21 from the outside of apparatus main body 10), the similar effect is obtained. As illustrated in FIG. 12, second electrode 33 having a rod shape may be disposed in storage tank 90 and in the vicinity of inlet 91 of storage tank 90, in addition to treatment tank 12. That is, the second electrode may be disposed on a side of central axis X1 of first inner wall 21 on the other end portion side (right side in FIGS. 11 and 12) of first inner wall 21.

Figure 13:
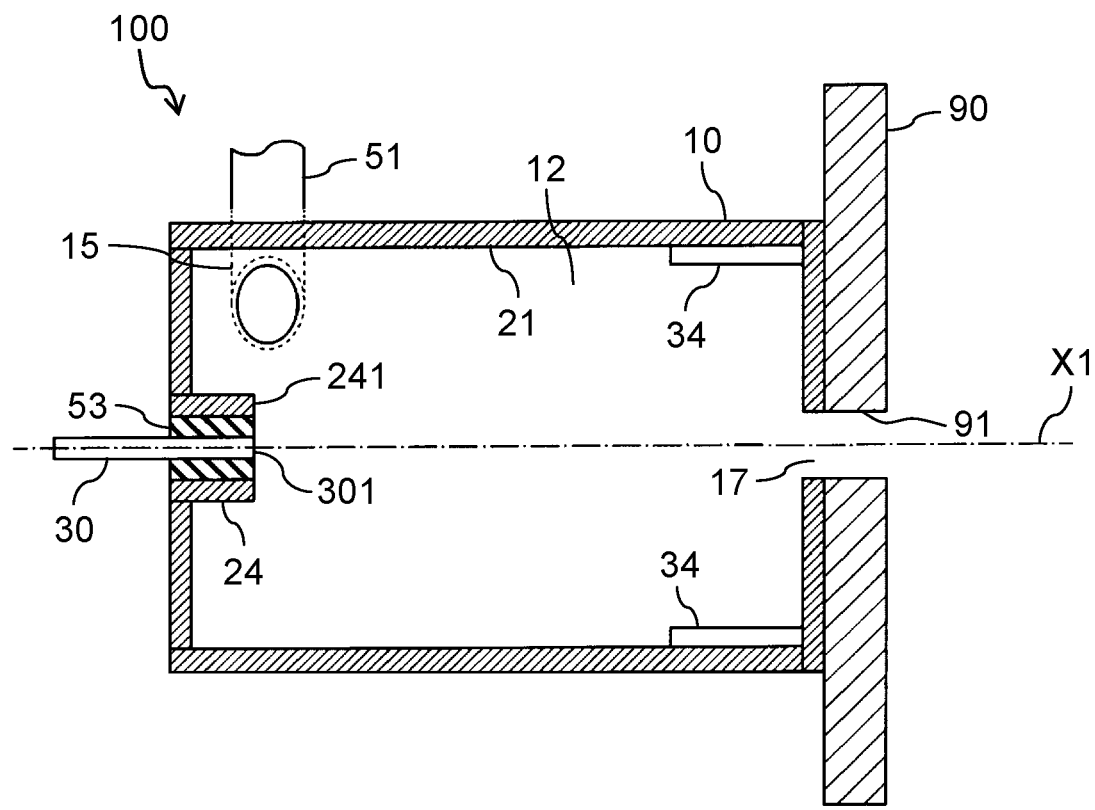
FIG. 13 is a side sectional view illustrating a modification example of the apparatus main body.
Figure 13:
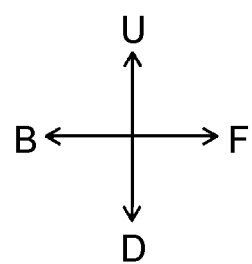

As illustrated in FIG. 13, tubular second electrode 34 may be disposed on an inside of first inner wall 21. That is, the second electrode may be a tubular electrode which is disposed to surround at least a portion of the entire circumference of central axis X1 of first inner wall 21 on the other end portion side (right side in FIG. 13) of first inner wall 21.

Although opening portion 311 is circular, opening portion 311 may be polygonal. Further, the second electrode may have a configuration of combining a plurality of metal members which are obtained by division. Preferably, in order not to disturb swirling flow F1, opening portion 311 may have a plate shape or a cylindrical shape which has a round hole. Since resistance of the water is reduced as the distance between gas phase G and the second electrode becomes shorter, and thus it is possible to suppress generation of Joule heat, the second electrode may be disposed at discharging portion 17 or in the vicinity of discharging portion 17 such that the distance between gas phase G and the second electrode is short.

The flow rate of water L1 introduced into treatment tank 12 is set to be a flow rate at which gas phase G is generated in swirling flow F1, in accordance with the shape and the like of treatment tank 12. Regarding the pulse voltage applied between first electrode 30 and second electrode 31, a case where not a bipolar voltage but a monopolar voltage is applied, a voltage, a pulse width, a frequency, or the like may be appropriately set to be a value which allows plasma P to be generated in gas phase G generated in swirling flow F1.

Further, power source 60 may be a high-frequency power source or the like other than a pulse power source so long as the effect of Exemplary embodiment 1 is obtained. Preferably, since pH between the electrodes is biased by electrolysis of the water, bipolar application which allows a cathode and an anode to exchange with each other may be performed.

Figure 14A:
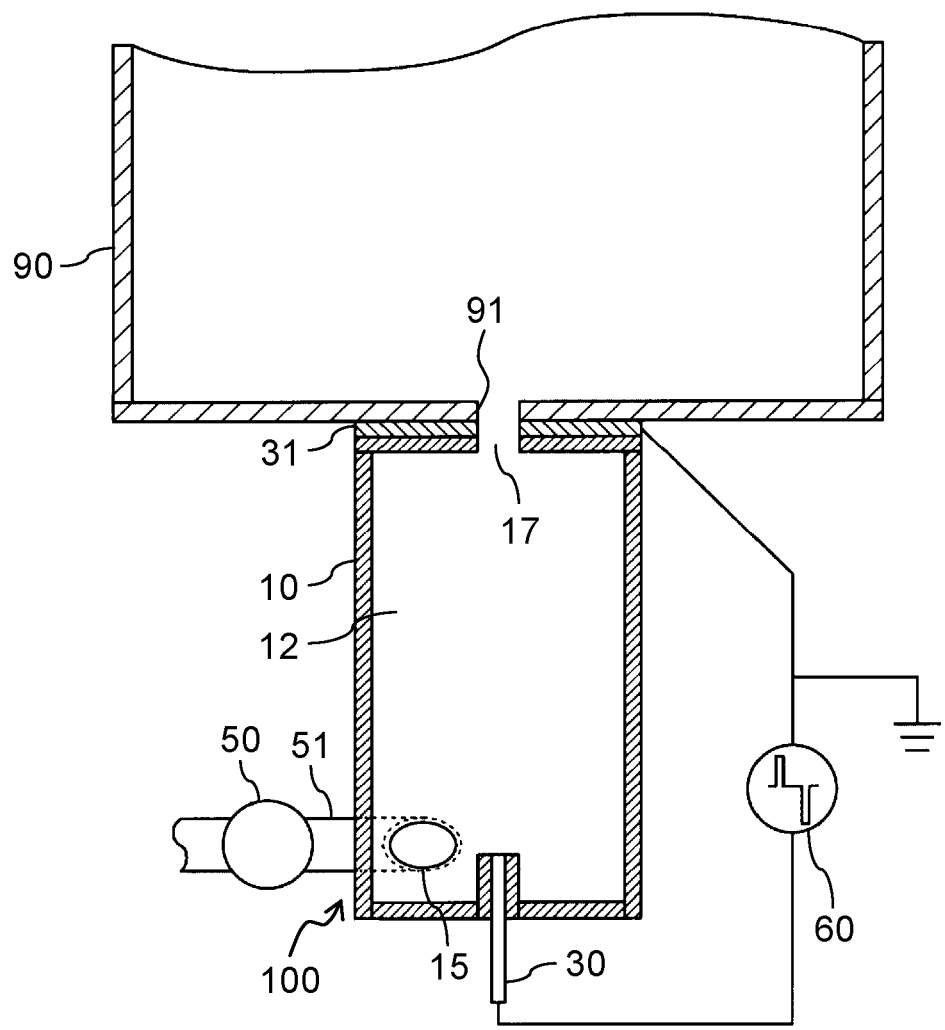
FIG. 14A is a side sectional view illustrating a modification example of the apparatus main body.
Figure 14A:
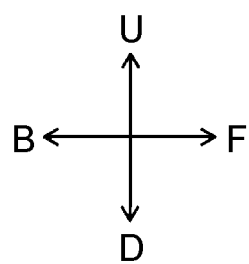

Although storage tank 90 is a tank, the shape of storage tank 90 is not limited thereto so long as the shape can hold water in storage tank 90, in order to shear swirling flow F1. For example, storage tank 90 may be a pipe for transporting the reformed liquid. Preferably, in order to prevent mixture of an air into treatment tank 12 by filling discharging portion 17 with water L1, as illustrated in FIG. 14A, apparatus main body 10 may discharge the reformed liquid upwardly and storage tank 90 may be provided on an upper side of apparatus main body 10.

Figure 14B:
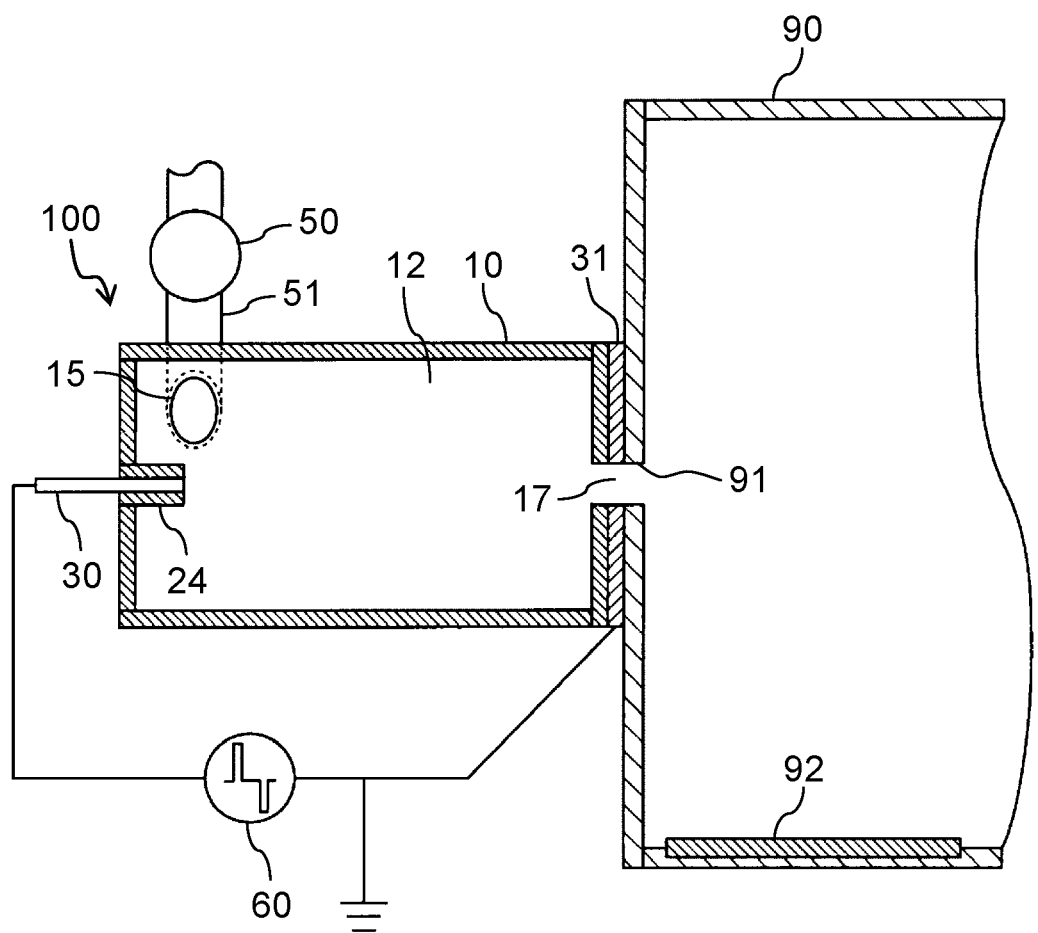
FIG. 14B is a side sectional view illustrating a case where a copper material is disposed at a portion of a storage tank in the modification example of the apparatus main body.
Figure 14B:
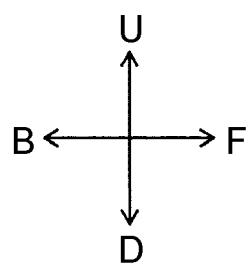
Figure 15:
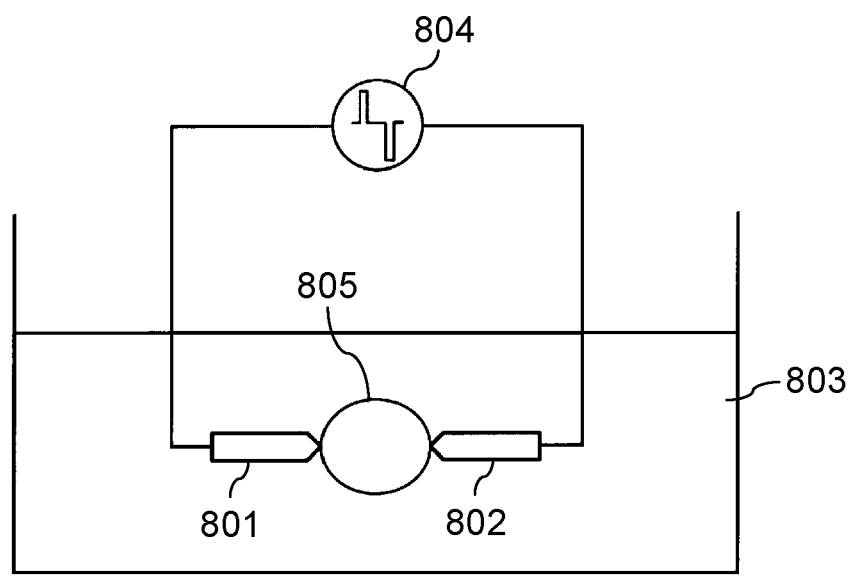
FIG. 15 is a schematic configuration diagram illustrating an apparatus for producing reforming liquid in the related art.
Figure 16:
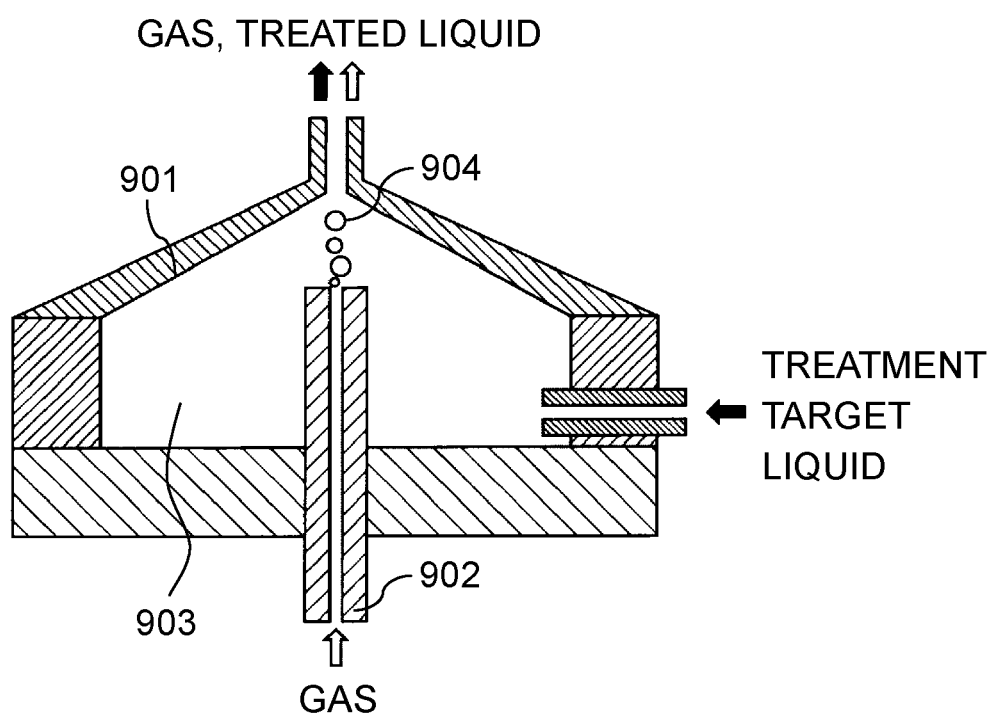
FIG. 16 is a schematic configuration diagram illustrating the an apparatus for producing reforming liquid in the related art, which includes a gas introduction device.

The material for forming storage tank 90 is not limited so long as water is not permeated. For example, as illustrated in FIG. 14B, plate member 92 which contains copper or iron and allows the high sterilization effect to be exhibited by causing the Fenton reaction with hydrogen peroxide water which is one reformed component can be used as a portion or the entirety of storage tank 90. Plate member 92 may be disposed in storage tank 90, as a member which is separate from storage tank 90. In short, if plate member 92 comes into contact with the reformed liquid in storage tank 90, it is possible to exhibit the high sterilization effect by causing the Fenton reaction with hydrogen peroxide water which is one reformed component.

In Exemplary embodiment 1, water L1 is reformed. However, a liquid to be reformed is not limited to the water. For example, ethanol may be used as the liquid.

Hitherto, Exemplary embodiment 1 is described, but Exemplary embodiment 1 described above is just an example for carrying out the disclosure. Thus, the disclosure is not limited to Exemplary embodiment 1 described above, and Exemplary embodiment 1 described above may be appropriately changed and carried out in a range without departing from the gist.

That is, among the exemplary embodiment or the various modification examples, any exemplary embodiment and any modification example are appropriately combined, and thus it is possible to exhibit effects obtained in the embodiment and the modification example, respectively. Combinations of the exemplary embodiments, combinations of the examples, or combinations of the exemplary embodiments and the examples may be made, and combinations of features in the exemplary embodiment and the example, which are different from each other may be made.

INDUSTRIAL APPLICABILITY

The apparatus for producing reforming liquid and the method for producing reforming liquid in the disclosure can produce a reformed liquid including a reformed component (radical, compound, or the like derived from a liquid), from the liquid by generating plasma in the liquid. Therefore, the apparatus for producing reforming liquid and the method for producing reforming liquid in the disclosure can be used in sterilization, deodorization, and various environmental improvements.

REFERENCE MARKS IN THE DRAWINGS

100 APPARATUS FOR PRODUCING REFORMING LIQUID
10 APPARATUS MAIN BODY
12, 121, 122 TREATMENT TANK
15 INTRODUCTION PORTION
17 DISCHARGING PORTION
21 FIRST INNER WALL
22 SECOND INNER WALL
23 THIRD INNER WALL
24 ELECTRODE SUPPORT TUBE
30 FIRST ELECTRODE
31 SECOND ELECTRODE
32 FIRST ELECTRODE HAVING PLATE SHAPE
32A FIRST ELECTRODE WHICH HAS PLATE SHAPE AND HAS PROTRUSION PORTION HAVING MOUNTAIN SHAPE AT CENTRAL PORTION
32B PROTRUSION PORTION HAVING MOUNTAIN SHAPE
33 SECOND ELECTRODE HAVING ROD SHAPE
34 TUBULAR SECOND ELECTRODE
50 LIQUID SUPPLIER
53 INSULATOR
60 POWER SOURCE
80 WATER TANK
81 ONE-DOT CHAIN LINE (CIRCULATION PIPE)
83 ACCOMMODATION SPACE
92 PLATE MEMBER
121, 122 TREATMENT TANK
151 OPENING END
241 INNER SIDE END SURFACE
301 RIGHT END PORTION
311 OPENING PORTION
801 FIRST ELECTRODE
802 SECOND ELECTRODE
803 LIQUID
804 PULSE POWER SOURCE
805 PLASMA
901 ANODE ELECTRODE
902 CATHODE ELECTRODE

903 TREATMENT TARGET LIQUID
904 GAS
B BACKWARD DIRECTION
BA BUBBLE
D DOWNWARD DIRECTION
F FORWARD DIRECTION
F1 SWIRLING FLOW
G GAS PHASE
L LEFT DIRECTION VIEWED FROM BACKWARD DIRECTION
L1 WATER
L2 REFORMED LIQUID
P PLASMA
R RIGHT DIRECTION VIEWED FROM BACKWARD DIRECTION
U UPWARD DIRECTION
X1 CENTRAL AXIS

The invention claimed is:

1. An apparatus for producing reforming liquid, the apparatus comprising:
   a treatment tank in which an introduced liquid is swirled so as to generate a gas phase in a vicinity of a swirling center of a swirling flow of the liquid;
   a first electrode which has at least a portion which is disposed in the treatment tank and comes into contact with the liquid in the treatment tank;
   a second electrode which is disposed so as to come into contact with the liquid;
   a power source which is configured to apply a voltage between the first electrode and the second electrode so as to generate plasma in the gas phase; and
   a liquid supplier configured to supply the liquid into the treatment tank via a pipe,
   wherein the treatment tank includes:
      an introduction portion which is configured to introduce the liquid from the pipe into the treatment tank;
      a discharging portion which is configured to discharge the liquid from the treatment tank;
      a first inner wall which has a cylindrical shape or a truncated cone shape;
      a second inner wall provided on an introduction portion side of the first inner wall; and
      a third inner wall provided on a discharging portion side of the first inner wall,
   wherein the introduction portion is disposed at one end portion side of a central axis of the first inner wall,
   wherein the introduction portion is positioned such that the liquid supplied by the liquid supplier at a predetermined pressure is introduced into the treatment tank from a tangential direction of a circular cross-sectional shape orthogonal to the central axis of the first inner wall to swirl the liquid along the first inner wall such that the gas phase is generated near the central axis of the first inner wall,
   wherein the second electrode is disposed on an outside of the third wall, the second electrode has an opening portion formed at a central portion of the second electrode, and a center of the opening portion of the second electrode coincides with the central axis,
   wherein a reformed liquid is produced in a manner that the plasma is generated in the gas phase so as to form a reformed component, and the formed reformed component is dissolved and dispersed in the liquid, and
   wherein the liquid introduced into the treatment tank and the reformed component formed in the treatment tank are discharged from the treatment tank to a storage tank, the storage tank has a sectional area which is greater than a sectional area of an opening of the discharging portion in the treatment tank, and the discharging portion is connected to an inlet of the storage tank.

2. The apparatus for producing reforming liquid of claim 1,
   wherein the first electrode is disposed so as to come into contact with the gas phase generated in the vicinity of the swirling center of the swirling flow of the liquid or to be positioned in a vicinity of the gas phase.

3. The apparatus for producing reforming liquid claim 1,
   wherein the swirling flow is generated in a manner that the liquid introduced from the introduction portion is swirled from the introduction portion toward the discharging portion.

4. The apparatus for producing reforming liquid of claim 3,
   wherein the first electrode is disposed on the central axis of the first inner wall or in a vicinity of the central axis.

5. The apparatus for producing reforming liquid of claim 4,
   wherein the first electrode is disposed on the central axis of the first inner wall or at the one end portion side in the vicinity of the central axis, and
   the discharging portion is disposed at another end portion side of the central axis.

6. The apparatus for producing reforming liquid of claim 5,
   wherein the second electrode is an electrode which has a plate shape and is disposed to surround at least a portion of an entire circumference of the central axis of the first inner wall.

7. The apparatus for producing reforming liquid of claim 5,
   wherein the second electrode is an electrode which is tubular and is disposed to surround at least a portion of an entire circumference of the central axis of the first inner wall.

8. The apparatus for producing reforming liquid claim 1,
   wherein the second electrode is exposed to the discharging portion.

* * * * *